United States Patent
Banerjee et al.

(10) Patent No.: US 11,873,383 B2
(45) Date of Patent: Jan. 16, 2024

(54) THERMOCHROMIC FENESTRATION FILMS CONTAINING VANADIUM DIOXIDE NANOCRYSTALS

(71) Applicant: THE TEXAS A&M UNIVERSITY SYSTEM, College Station, TX (US)

(72) Inventors: Sarbajit Banerjee, College Station, TX (US); Kate E. Pelcher, College Station, TX (US); Nathan A. Fleer, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 789 days.

(21) Appl. No.: 16/624,872

(22) PCT Filed: Jun. 28, 2018

(86) PCT No.: PCT/US2018/040064
§ 371 (c)(1),
(2) Date: Dec. 19, 2019

(87) PCT Pub. No.: WO2019/006151
PCT Pub. Date: Jan. 3, 2019

(65) Prior Publication Data
US 2020/0131328 A1    Apr. 30, 2020

Related U.S. Application Data

(60) Provisional application No. 62/526,257, filed on Jun. 28, 2017.

(51) Int. Cl.
*C08K 3/22* (2006.01)
*C08K 7/08* (2006.01)
(Continued)

(52) U.S. Cl.
CPC .............. *C08K 3/22* (2013.01); *C01G 31/02* (2013.01); *C08K 7/08* (2013.01); *C08K 9/02* (2013.01);
(Continued)

(58) Field of Classification Search
None
See application file for complete search history.

(56) References Cited

U.S. PATENT DOCUMENTS

2013/0101848 A1    4/2013  Banerjee et al.
2015/0132494 A1*   5/2015  Luo ..................... C01G 31/02
                                                         549/208
(Continued)

FOREIGN PATENT DOCUMENTS

WO       0046867 A1    8/2000

OTHER PUBLICATIONS

Search Report dated Aug. 28, 2018, for International Patent Application No. PCT/US2018/040064. (4 pages).
(Continued)

*Primary Examiner* — Ronak C Patel
(74) *Attorney, Agent, or Firm* — Christensen O'Connor Johnson Kindness PLLC

(57) ABSTRACT

Vanadium oxide nanomaterial composite compositions and substrates including films comprising vanadium oxide nanomaterial composite compositions are described. A film and composition generally including a polymeric matrix; and a crystalline vanadium oxide nanomaterial dispersed in the polymeric matrix, wherein the crystalline vanadium oxide nanomaterial comprises a smallest dimension between about 100 nm and about 5 nm.

16 Claims, 14 Drawing Sheets

(51) Int. Cl.
    *C08K 9/02*         (2006.01)
    *C08J 5/18*         (2006.01)
    *C01G 3/02*        (2006.01)
    *E06B 9/24*        (2006.01)
    *C01G 31/02*      (2006.01)

(52) U.S. Cl.
    CPC ...... *C01P 2002/72* (2013.01); *C01P 2004/04* (2013.01); *C01P 2004/16* (2013.01); *C01P 2004/64* (2013.01); *C01P 2004/84* (2013.01); *C01P 2006/60* (2013.01); *C08K 2201/011* (2013.01)

(56) References Cited

U.S. PATENT DOCUMENTS

2016/0257823 A1    9/2016    Amano
2017/0174526 A1    6/2017    Banerjee et al.

OTHER PUBLICATIONS

Written Opinion dated Aug. 28, 2018, for International Patent Application No. PCT/US2018/040064. (5 pages).
International Preliminary Report on Patentability and Written Opinion dated Dec. 31, 2019, issued in International Application No. PCT/US2018/040064, filed Jun. 28, 2018, 7 pages.

* cited by examiner

THERMOCHROMIC FENESTRATION FILMS CONTAINING VANADIUM DIOXIDE NANOCRYSTALS

BACKGROUND

Buildings consume an inordinately large amount of energy across the planet and are often static structures that interact little with their outside environment. A recent report from the United Nations estimates that 30-40% of primary energy usage across the world occurs within buildings. In the United States, the Department of Energy estimates that 41% of the total energy consumption occurs within buildings. Much of the energy consumed within buildings goes towards space cooling, space heating, lighting, and ventilation. Incorporating responsive elements that can adapt to external stimuli (e.g., external temperature and humidity) within structural elements has been proposed as a potential means of reducing the energy footprint of buildings.

Fenestration elements, such as windows, doors, and skylights, play an important role in determining the solar heat gain of a building. Such elements must balance the competing needs of enabling interiors to be lighted using natural daylight while modulating solar heat gain to acceptable levels.

Consequently, there is great interest in spectrally selective glazing and thin films that allow for transmission of visible light but exhibit dynamically tunable infrared transmittance. Such thin films are expected to bring about substantial energy savings by blocking (reflecting or absorbing) infrared (IR) and near-infrared (NIR) light during periods of high ambient temperature (thereby reducing the need for space cooling), but permitting transmittance of IR and NIR light during periods of low ambient temperature when the solar heat gain can be harnessed to reduce heating costs.

Dynamically tunable glazing requires stimuli-responsive modulation of optical transmittance, which can be achieved variously by means of thermotropic or lyotropic phase transitions in polymers or hydrogels, electric-field-induced ion intercalation in redox-active host materials, reversible amorphous to crystalline transitions in phase-change materials, electric-field-induced change of polarization of liquid crystals, or electronic solid-solid phase transitions. Thermochromic transitions are particularly important as a facile means of developing dynamically switchable glazing that does not require external voltage control. Compounds that exhibit pronounced modulations of optical transmittance as a result of electronic transitions wherein the intrinsic electronic conductivity (carrier concentration and/or mobility) is dramatically altered are particularly attractive. Accordingly, thermochromic modulation of NIR solar flux represents an attractive route for controlling solar heat gain based on the ambient temperature without deleteriously impacting the visible light transmittance of fenestration elements.

However, there exists only a relatively sparse set of compounds characterized by large thermally induced modulations of electrical conductance; such electronic phase transitions are underpinned typically by either electron correlation or electron-phonon coupling. Further, integration of thermochromic components into fenestration elements presents numerous challenges, including retaining high levels of visible light transmission through the fenestration element, mitigation of light scattering as it passes through the fenestration element, and physical integrity of the thermochromic components as they are thermally cycled.

Accordingly, there is presently a need for compositions and substrates for thermochromic modulation of NIR solar flux having high visible light transmission, low light scattering, and long-term physical integrity of thermochromic components. The present disclosure addresses these needs as well as provides additional related benefits.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides a composition generally including a polymeric matrix; and a crystalline vanadium oxide nanomaterial dispersed in the polymeric matrix, wherein the crystalline vanadium oxide nanomaterial comprises a smallest dimension between about 100 nm and about 5 nm.

In another aspect, the present disclosure provides a substrate having a surface, wherein the surface generally includes a film comprising: a polymeric matrix; and a crystalline vanadium oxide nanomaterial dispersed in the polymeric matrix, wherein the crystalline vanadium oxide nanomaterial comprises a smallest dimension between about 100 nm and about 5 nm.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1A:
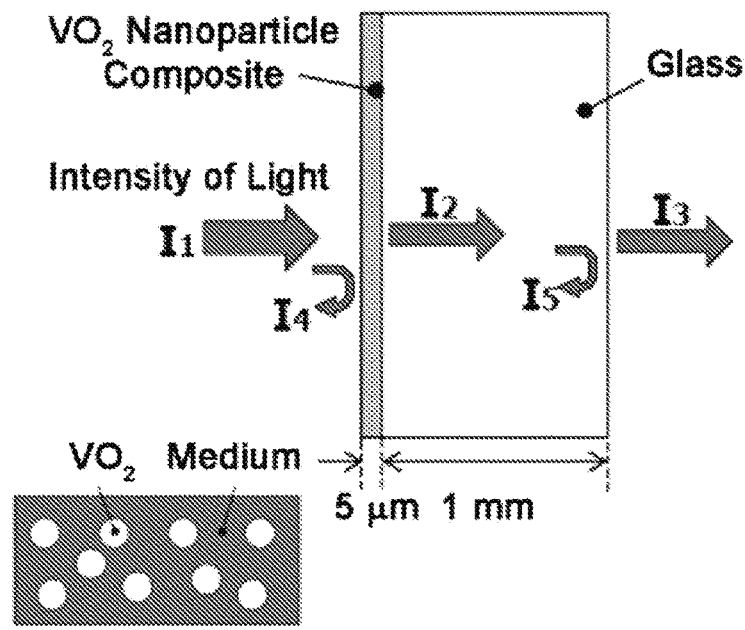
FIG. 1A schematically illustrates the transmission of light through a composition according to an embodiment of the present disclosure including $VO_2$ nanoparticles embedded within a polymeric film cast substrate where $I_1$ is represents incident light, $I_3$ represents the transmitted light, and $I_4$ represents the reflected light. Bulk optical constants for the insulating and metallic phases of $VO_2$ are used as described in the text.
Figure 1B:
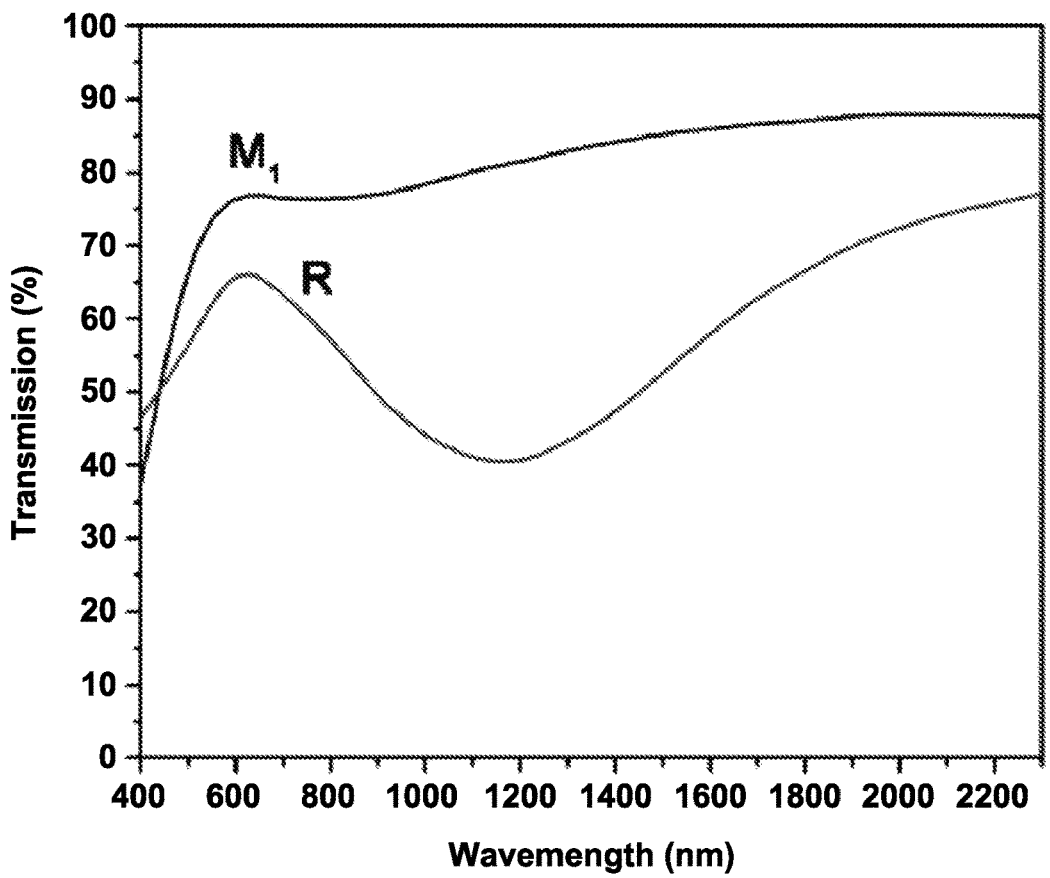
FIG. 1B graphically illustrates a transmittance spectrum of the film of FIG. 1A simulated based on the effective medium model for spherical nanoparticles of insulating and metallic $VO_2$.

The present disclosure provides thermochromic composite compositions and substrates including films comprising thermochromic composite compositions.

Thermochromic Composite Compositions

Thermochromic modulation of near-infrared (NIR) solar flux represents an attractive route for controlling solar heat gain based on the ambient temperature without deleteriously impacting the visible light transmittance of fenestration elements. As above, however, incorporation of thermochromic materials into fenestration elements presents several challenges.

Accordingly, in an aspect the present disclosure provides a composition comprising a polymeric matrix; and a thermochromic material dispersed in the polymeric matrix to address these challenges. As used herein, "thermochromic" refers to a material or composition that changes its light absorption, light transmittance, or light reflectivity due to a change in temperature. As discussed further herein, such compositions dynamically modulate transmission of light as a function of temperature.

In an embodiment, the thermochromic material is a vanadium oxide thermochromic material. The binary vanadium dioxide ($VO_2$) is notable in having an electronic phase transition that occurs in close proximity to room temperature. In the bulk, the metal-insulator transition of $VO_2$ is observed at ca. 67° C. but can be depressed through either size control and/or doping. The pronounced near-room-temperature metal-insulator transition of $VO_2$ provides a means to modulate solar heat gain in a spectrally selective manner.

In an embodiment, the thermochromic material is a crystalline nanomaterial. Nanocrystals provide distinct advantages over continuous thin films in being able to better accommodate strains arising from thermal cycling and in affording a higher visible light transmittance. Strain-induced delamination and pulverization of continuous thin films resulting from the lattice mismatch at the monoclinic-tetragonal structural phase transition can be mitigated. Further, nanocrystals embedded within thin films serve as retrofittable solutions that can be deployed onto existing buildings without requiring replacement of insulating glass units. Additionally, nanocrystals can be prepared in high-crystalline quality by scalable solution-phase methods and do not require high-vacuum apparatus necessary for physical vapor deposition As discussed further herein, in order to maintain high levels of visible light transmittance and high levels of thermochromic modulation of near-infrared light transmittance, preferred crystalline vanadium oxide nanomaterial dimensions are used to mitigate light scattering. In this regard, in an embodiment, the crystalline vanadium oxide nanomaterial comprises an average smallest dimension between about 5 nm and about 100 nm. In an embodiment, the crystalline vanadium oxide nanomaterial comprises an average smallest dimension between about 5 nm and about 50 nm. In an embodiment, the crystalline vanadium oxide nanomaterial comprises an average smallest dimension between about 10 nm and about 50 nm. In an embodiment, the crystalline vanadium oxide nanomaterial comprises an average smallest dimension between about 25 nm and about 45 nm. In an embodiment, the crystalline vanadium oxide nanomaterial has a smallest dimension of about 40 nm.

In an embodiment, the crystalline vanadium oxide nanomaterial is a nanomaterial chosen from a nanoparticle, a nanowire, a nanorod, a nanosphere, a nanostar, and combinations thereof.

As described further herein, $VO_2$ has an electronic phase transition that occurs in close proximity to room temperature. Further, as described herein with respect to Example 10, the electronic transition includes a thermally induced transition from an insulator to a metal as temperature increases above an insulator-metal transition temperature. Such an insulator-metal transition is characterized by a sharp increase in carrier density upon metallization resulting in a corresponding increase in reflectance/absorption and a corresponding decrease in NIR light transmittance, as discussed further herein with respect to FIGS. 1B-1D and 4A-4D.

In an embodiment, the crystalline vanadium oxide nanomaterial has an insulator-metal electronic transition at a temperature between about −20° C. and about 100° C. In an embodiment, the crystalline vanadium oxide nanomaterial has an insulator-metal electronic transition at a temperature between about 20° C. and about 85° C. In an embodiment, the crystalline vanadium oxide nanomaterial has an insulator-metal electronic transition at a temperature between about 25° C. and about 45° C.

As described further herein, the vanadium oxide crystal nanomaterials modulate transmittance of NIR light as part of a temperature-dependent insulator-metal electronic transition. As used herein, modulation of light transmittance refers to a difference between an amount of light transmitted through a composition including crystalline nanomaterials in an insulator state and an amount of light transmitted through the composition including the crystalline nanomaterial in a metallic state. As the vanadium oxide crystal nanomaterials transition from an insulator to a metal, less light, particularly less NIR light, is transmitted through a composition comprising the metallic vanadium oxide crystal nanomaterials. In this regard, compositions of the present disclosure including nanomaterials in a metallic state are configured to reduce solar heat gain compared to the same composition in which the nanomaterial is in an insulator state.

In an embodiment, such modulation of light transmittance can be quantified as the solar ($T_{sol}$: 400-2500 nm), luminous ($T_{lum}$: 400-780 nm) and NIR ($T_{NIR}$: 780-2500 nm) transmittance, which are determined according to the following equations:

$$T_x = \frac{\int \varphi_x(\lambda) T(\lambda) d\lambda}{\int \varphi_x T(\lambda) d\lambda} \text{ where } x = sol/lum/NIR \quad (1)$$

$$\Delta T_x = T_x(\text{low temp}) - T_x - (\text{high temp}) \quad (2)$$

where $T(\lambda)$ is the recorded film transmittance, and $\varphi_x(\lambda)$ is the solar irradiance spectrum distribution for air mass 1.5 (corresponding to the sun at 37° above the horizon) over the wavelength range specified. The wavelength ranges for the sol, lum, and NIR ranges of the electromagnetic spectrum denoted as subscripts in Equation 1 are defined as 400-2500 nm, 400-780 nm, and 780-2500 nm respectively.

In an embodiment, such modulation of light transmittance can be expressed as a percentage using the following formula:

$$\left[\frac{T_i - T_m}{T_i}\right] * 100,$$

where $T_i$ is the transmittance of light through a composition in which the vanadium oxide crystal nanomaterials are in an insulating state, and $T_m$ is the transmittance of light through the composition in which the vanadium oxide crystal nanomaterials are in a metallic state.

In an embodiment, modulation of NIR light transmittance is measured at a particular wavelength. In an embodiment, modulation of NIR light transmittance is measured over a wavelength range.

In an embodiment, the modulation of light transmittance between about 680 nm and about 2,500 nm is greater than about 5%. In an embodiment, the integrated modulation of light transmittance between about 680 nm and about 2,500 nm is between 5% and 90%. In an embodiment, integrated modulation of NIR light transmittance is between about 20% and about 50%. In an embodiment, integrated modulation of total solar light transmittance is between about 5% and about 50%. In an embodiment, integrated modulation of visible light transmittance is between about 0% and about 50%.

In an embodiment, onset of NIR light transmittance modulation occurs between about 680 nm and about 1750 nm. In an embodiment, onset of NIR light transmittance modulation occurs between about 700 nm and about 850 nm. In an embodiment, onset of NIR light transmittance modulation occurs between about 740 nm and about 800 nm. As used herein, onset of light transmittance modulation refers to a shortest wavelength at which a composition reduces transmission of light through the composition when a nanomaterial dispersed therein is a metallic state relative to light transmitted through the composition when the nanomaterial is in an insulator state.

As discussed further herein with respect to Example 10, onset of modulation of light transmittance factors into the efficacy of a composition to modulate transmission and solar heat gain. Onset of NIR light transmittance modulation at relatively shorter wavelengths denotes an ability to dynamically adjust transmittance for a wider portion of the solar spectrum compared to compositions having an onset at a longer wavelength. Accordingly, in an embodiment, compositions described herein have an onset of modulation of NIR light transmittance between about 680 nm and about 1750 nm.

Further, in certain embodiments, NIR light transmittance modulation below 680 nm is not desirable since such modulation leads to a pronounced change of the visible appearance of the film. Accordingly, in an embodiment, the compositions described herein have an onset of modulation of NIR light transmittance greater than or equal to 680 nm.

In an embodiment, the crystalline vanadium oxide nanomaterial includes crystalline vanadium oxide nanomaterial encapsulated in a matrix. As discussed further herein with respect to Example 4, the encapsulating matrix protects the crystalline vanadium oxide nanomaterial from oxidative degradation without or without substantially changing the magnitude of or phase transition temperature of the crystalline vanadium oxide nanomaterial. Additionally, such matrices passivate surfaces of the crystalline vanadium oxide nanomaterial, endow thermal stability to the crystalline vanadium oxide nanomaterial, enhance dispersion of the crystalline vanadium oxide nanomaterial into a polymeric matrix, and reduce the differential in refractive index between the nanocrystals and the polymeric medium, thereby mitigating a primary scattering mechanism.

In an embodiment, the encapsulated crystalline vanadium oxide nanomaterials include nanomaterial comprising a crystalline vanadium oxide core and a shell comprising the matrix entirely or partially covering the crystalline vanadium oxide core. In an embodiment, the matrix is crystalline. In an embodiment, the matrix is amorphous. In an embodiment, the matrix comprises a material chosen from an oxide, oxyhalide, oxyhydroxide, hydroxide, carbide, sulfide, selenide, and combinations thereof. In an embodiment, the matrix is amorphous and comprises a material chosen from silicon oxide, titanium oxide, vanadium oxide, zinc oxide, hafnium oxide, aluminum oxide, zirconium oxide, cerium oxide, molybdenum oxide, and combinations thereof. In an embodiment, the shell material has a refractive index intermediate between that of vanadium oxide and the host polymeric matrix. In an embodiment, multiple shells are used to provide a gradient of refractive indices (high to low) from the vanadium oxide core to the host polymer matrix.

The compositions of the present disclosure include a polymeric matrix; and a crystalline vanadium oxide nanomaterial dispersed in the polymeric matrix. As discussed further herein, nanomaterials dispersed in a host matrix provide numerous advantages over continuous thin films including, for example, accommodation of strains due to thermal cycling, affording a higher visible light transmittance, and mitigation of strain-induced delamination and pulverization resulting from the lattice mismatch at the monoclinic-tetragonal structural phase transition. The substantial lattice strain accompanying the structural phase transformation renders the deployment of continuous thin films rather difficult and instead nanostructures embedded within suitable matrices are better able to accommodate such strain. Further, by dispersing the crystalline vanadium oxide nanomaterial within the polymer matrix, scattering of incident light, such as visible light is mitigated thereby providing a more optically clear composition. In an embodiment, the polymeric matrix comprises a polymeric material chosen from a cellulosic polymer, a polycarbonate, a polyimide, a polyurethane, and an acrylic acid/acrylate copolymer.

In an embodiment, a dried weight:weight ratio of crystalline vanadium oxide nanomaterials to polymeric matrix is between about 0.01:1 to about 0.6:1. In an embodiment, a dried weight:weight ratio of crystalline vanadium oxide nanomaterials to polymeric matrix is between about 0.05:1 to about 0.25:1. In an embodiment, a dried weight:weight ratio of crystalline vanadium oxide nanomaterials to polymeric matrix is between about 0.1:1 to about 0.25:1.

In an embodiment, the polymeric matrix has a refractive index of between 0.0001 and 3.

Representative compositions of the present disclosure are described in Examples 1-10.

Thermochromic Substrates

As discussed further herein, the compositions of the present disclosure have advantageous optical clarity and visible light transmission, while also having high levels of NIR light transmittance modulation. Accordingly, in another aspect, the present disclosure provides a substrate having a surface, wherein the surface comprises a film comprising a composition of the present disclosure. In an embodiment, the film comprises a polymeric matrix; and a crystalline vanadium oxide nanomaterial dispersed in the polymeric matrix, wherein the crystalline vanadium oxide nanomaterial comprises a smallest dimension between about 100 nm and about 5 nm.

In an embodiment the substrate is a portion of a fenestration element configured to transmit at least a portion of incident visible light and reflect/absorb at least a portion of NIR and IR light, particularly when over an insulator-metal transition temperature. In an embodiment, the substrate is part of a window unit, an insulating glass unit, a skylight, a glazed door, a vehicular glazing unit, or the like. In an embodiment, the substrate is chosen from glass, silicon oxide, sapphire, alumina, polymer, plastic, and indium tin oxide-coated glass.

In an embodiment, the substrate is configured to couple to an existing fenestration element without replacement of an optically clear portion of the fenestration element. In an embodiment, the film has a thickness of between about 500 nm and about 500 microns. In an embodiment, the film has a thickness of between about 1 micron and about 350 microns. In an embodiment, the film has a thickness of between about 10 microns and about 200 microns. In an embodiment, the film has a thickness of between about 500 nm and about 3 microns. In an embodiment, the film has a thickness of between about 200 nm and about 1 micron. In an embodiment, the film has a thickness of between about 100 nm and about 5 microns. In an embodiment, the film has a thickness of between about 10 nm and about 50 microns.

In an embodiment, the integrated visible light transmittance of the film is between about 15% and about 90%. In an embodiment, the integrated visible light transmittance of the film is between about 15% and about 70%. In an embodiment, the integrated visible light transmittance of the film is between about 15% and about 50%. In an embodiment, the integrated visible light transmittance of the film is between about 20% and about 50%. In an embodiment, the integrated visible light transmittance of the film is between about 25% and about 55%. In an embodiment, the integrated visible light transmittance of the film is between about 25% and about 70%.

In an embodiment, the films described herein have a maximum transmittance in the visible range between about 15% and about 90%. In an embodiment, the films described herein have a maximum transmittance in the visible range between about 25% and about 70%.

As discussed further herein with respect to TABLE 1, transmittance in the visible spectrum is dependent upon, inter alia, particle size, thickness of anti-reflective shell, effective refractive index of shell material, and particle loading in the polymeric matrix.

Representative substrates are discussed further herein with respect to Examples 6-10.

EXAMPLES

Example 1: Synthesis of VO$_2$ Nanowires

VO$_2$ nanowires were synthesized through a variation of the one-step hydrothermal method. Briefly, stoichiometric amounts of micron-sized V$_2$O$_5$ powder (Sigma-Aldrich, 98%) were placed in a polytetrafluoroethylene cup with deionized water ($\rho$=18.2 M$\Omega$/cm, Barnstead Water Purification System) and a reducing agent (either 2-propanol or acetone). The cup was then sealed in an autoclave and heated at 210° C. for 18-72 hours. The synthesized powder was then vacuum filtered and washed with 2-propanol (Sample I), acetone (Sample A), and/or water. The powders were subsequently annealed at 550° C. under inert Ar atmosphere for several hours to obtain pure VO$_2$ nanocrystals crystallized in the M1 phase upon cooling.

Example 2: Dispersion Milling of VO$_2$ Nanowires

Figure 2A:
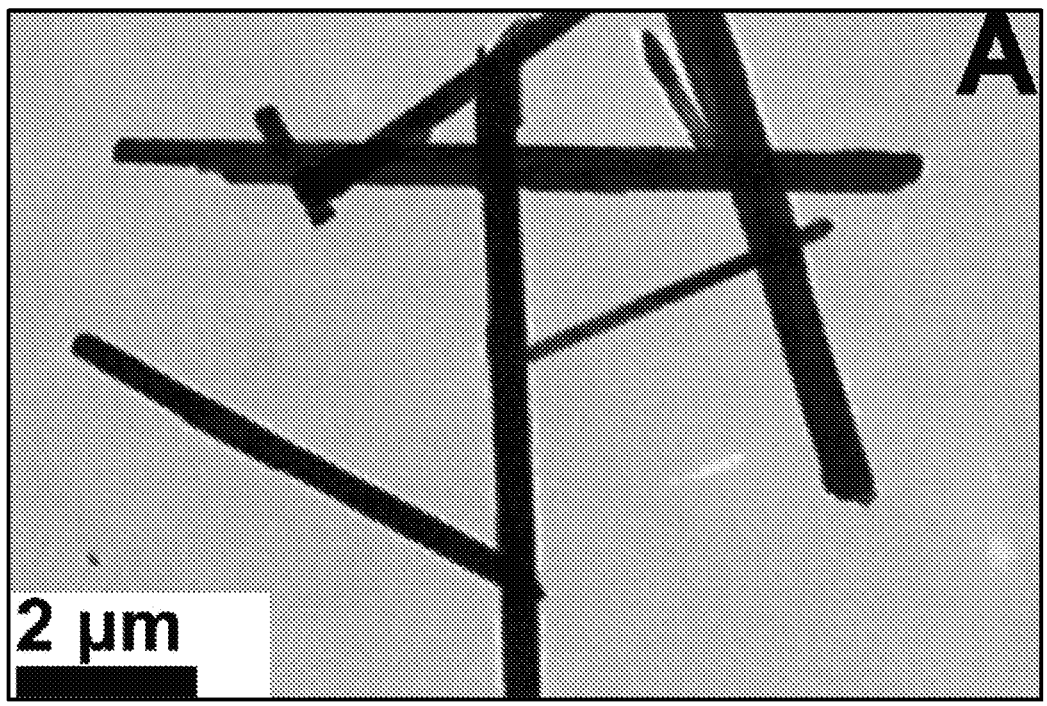
FIG. 2A is a transmission electron microscopy (TEM) image of $VO_2$ nanocrystals grown via hydrothermal reduction of $V_2O_5$ by 2-propanol ("Sample I") in accordance with an embodiment of the disclosure.
Figure 2B:
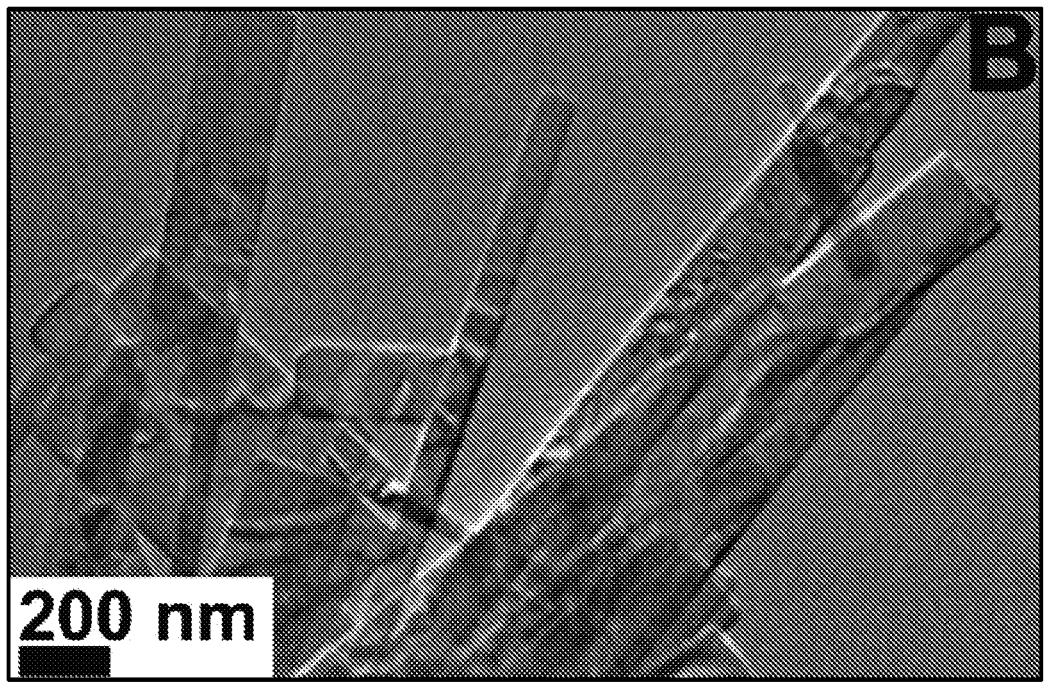
FIG. 2B is a TEM image of $VO_2$ nanocrystals grown by hydrothermal reduction of $V_2O_5$ by acetone ("Sample A") in accordance with an embodiment of the disclosure.
Figure 2C:
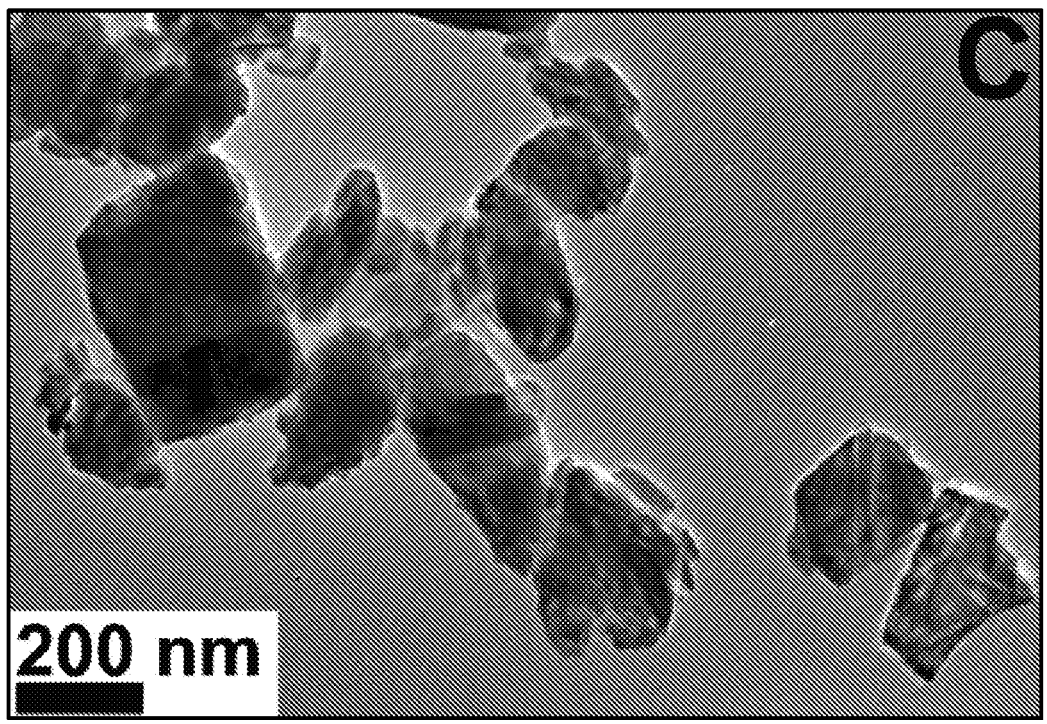
FIG. 2C is a TEM image of $VO_2$ nanocrystals grown by hydrothermal reduction of $V_2O_5$ followed by dry-milling with methacrylate polymer beads ("Sample I-BM") in accordance with an embodiment of the disclosure.

VO$_2$ nanowires synthesized hydrothermally via reduction with 2-propanol were dry-milled with methacrylate polymer beads to obtain Sample I-BM (FIG. 2C). The samples were milled for a total of 90 minutes at 30 minute intervals using a SPEX SamplePrep 510 Mixer Mill.

Example 3: Synthesis of Ultra-small VO$_2$ Nanocrystals

Ultra-small VO$_2$ nanocrystals (Sample US) were synthesized via a two-step reaction developed based on the literature. The first step involved the precipitation of VO(OH)$_2$ from the reaction of NH$_4$VO$_3$ and H$_2$NNH$_2$ at 80° C. in deionized water (p=18.2 M$\Omega$/cm, Barnstead Water Purification System). The VO(OH)$_2$ precipitate was then placed within a hydrothermal vessel and heated at 210° C. for 24-72 hours. The product was finally isolated through centrifugation and used without further annealing or milling.

Example 4: Deposition of a SiO$_2$ Shell and Preparation of VO$_2$@SiO$_2$ Nanocrystals An amorphous silica shell was deposited onto nanoparticles using a modified Stöber method as previously reported. Briefly, VO$_2$ nanocrystals (24 mg to 240 mg) were sonicated in a 4:1 ethanol:water solution until well-dispersed. Ammonium hydroxide was added as a catalyst followed by addition of tetraethylorthosilicate. The reaction was allowed to proceed for 25 min and the resulting VO$_2$@SiO$_2$ nanocrystals were collected by centrifugation.

Figure 2D:
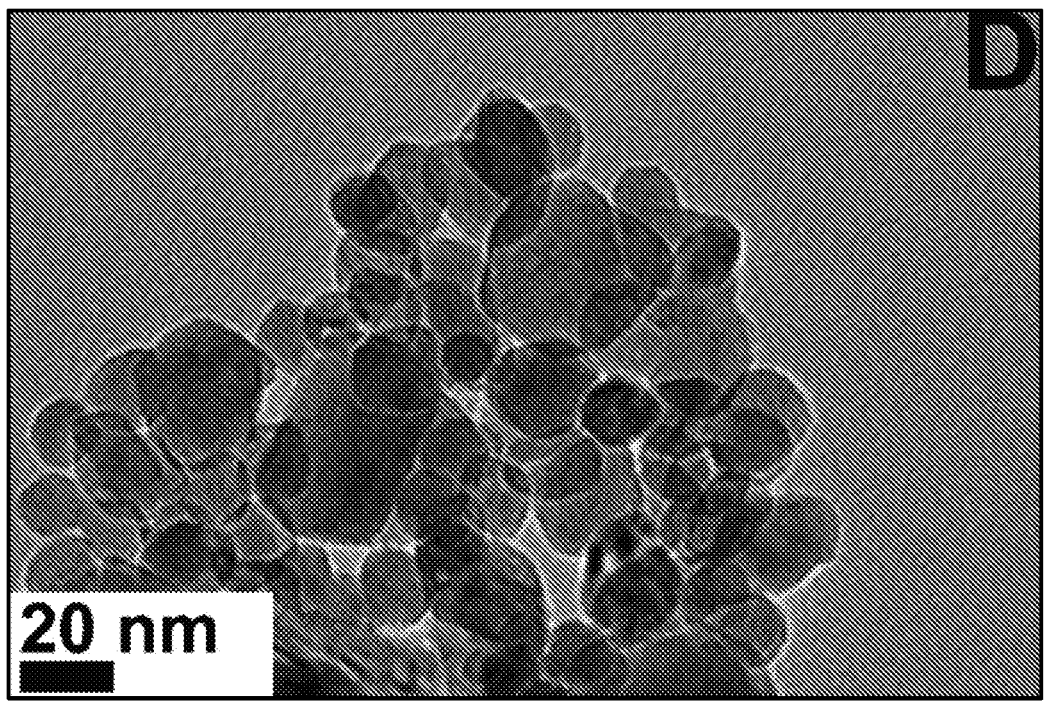
FIG. 2D is a TEM image of $VO_2$ nanocrystals grown by precipitation of $VO(OH)_2$ followed by hydrothermal crystallization ("Sample US") in accordance with an embodiment of the disclosure.
Figure 2E:
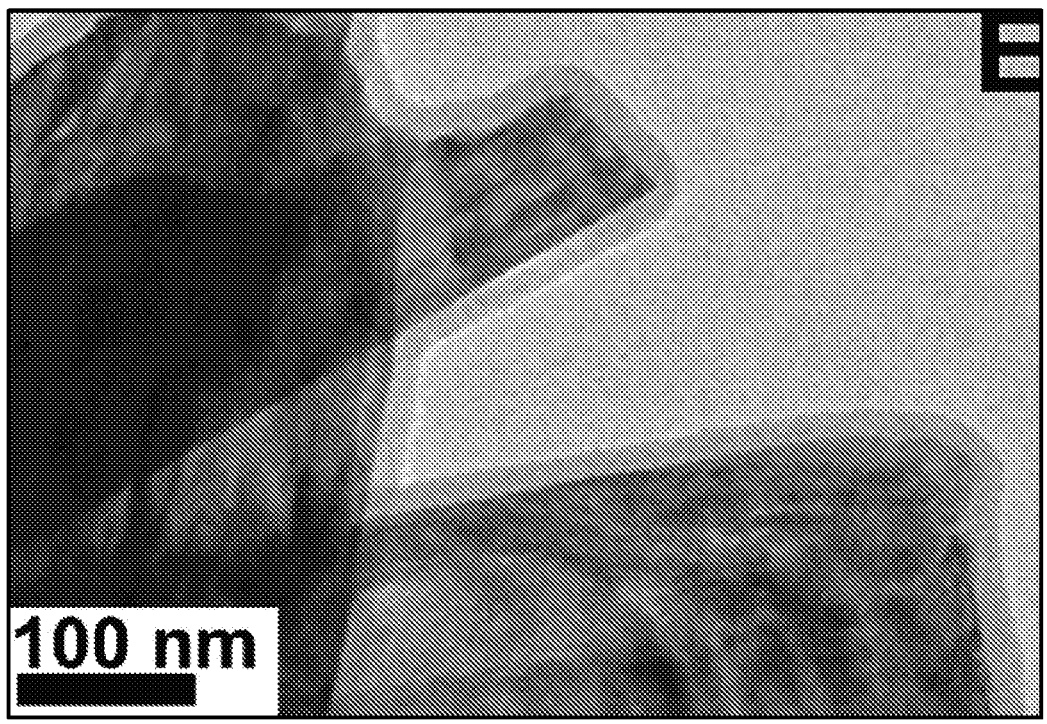
FIGS. 2E and 2F are TEM images of $VO_2$ nanocrystals coated with an amorphous $SiO_2$ shell for E) Sample I and F) Sample US, respectively, in accordance with embodiments of the present disclosure.
Figure 2F:
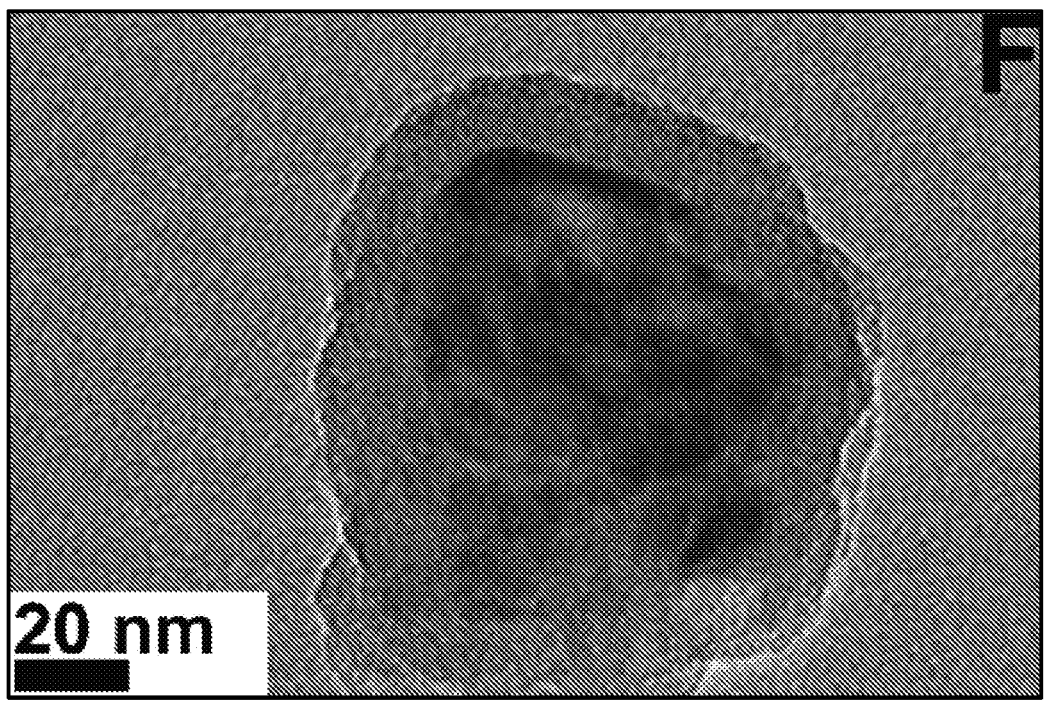

The amorphous silica shell protects the VO$_2$ nanocrystals from oxidative degradation and serve as an anti-reflective coating. The silica shells do not alter the magnitude or phase transition temperature but passivate the surfaces of VO$_2$, endow stability up to temperatures of 300° C., and allow for much improved dispersion in aqueous media. In the absence of a SiO$_2$ coating, VO$_2$ nanocrystals dispersed in aqueous media are rapidly degraded to green sub-stoichiometric vanadium oxides and orange V$_2$O$_5$. The absence of a coating further results in increased haze as a result of the refractive index mismatch between the vanadium oxide core and the polymeric host matrix. All four samples noted above have been coated with SiO$_2$ using a modified Stöber approach. FIGS. 2E and 2F depict representative TEM images of silica-coated VO$_2$ nanocrystals indicating an average shell thickness of 20 nm.

Example 5: Polymeric Dispersions

In order to devise a scalable process for casting thin films of VO$_2$ nanocrystals, methacrylic acid/ethyl acrylate copolymer is used as a dispersant and thickener. VO$_2$@SiO$_2$ core-shell nanocrystals were dispersed in 10 mL of an alkali water solution (pH of ca. 11.3) in a glass vial by ultrasonication. The dispersion was then gently stirred and methacrylic acid/ethyl acrylate copolymer (specifically, Acrysol ASE-60 from the Dow Chemical Company) was introduced at 1 wt. % relative to water (adjusted to account for Acrysol ASE-60's solid content being around 28%). The solution was stirred more vigorously as the solution thickened to further homogeneously disperse the nanocrystals within the polymeric formulation. When all of the methacrylic acid/ethyl acrylate copolymer had dissolved (ca. 20 min), the dispersion was allowed to stand and used for casting thin films.

Figure 3A:
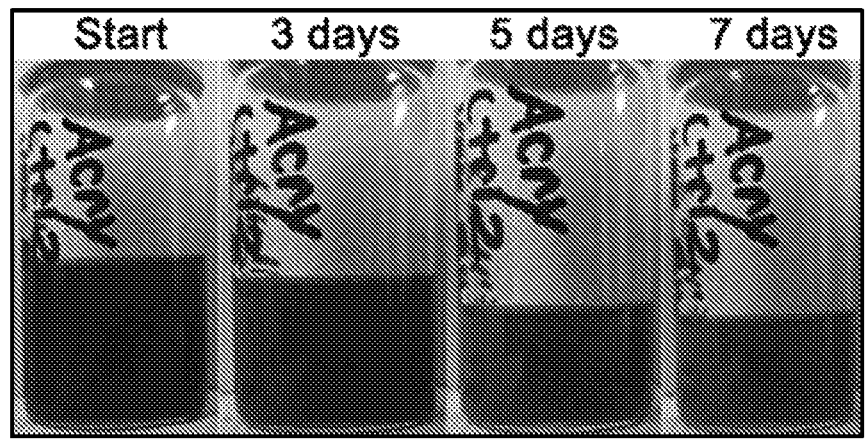
FIG. 3A is digital photograph of aqueous dispersions of $VO_2@SiO_2$ nanocrystals dispersed using a methacrylic acid/ethyl acrylate copolymer in accordance with embodiments of the present disclosure.
Figure 3B:
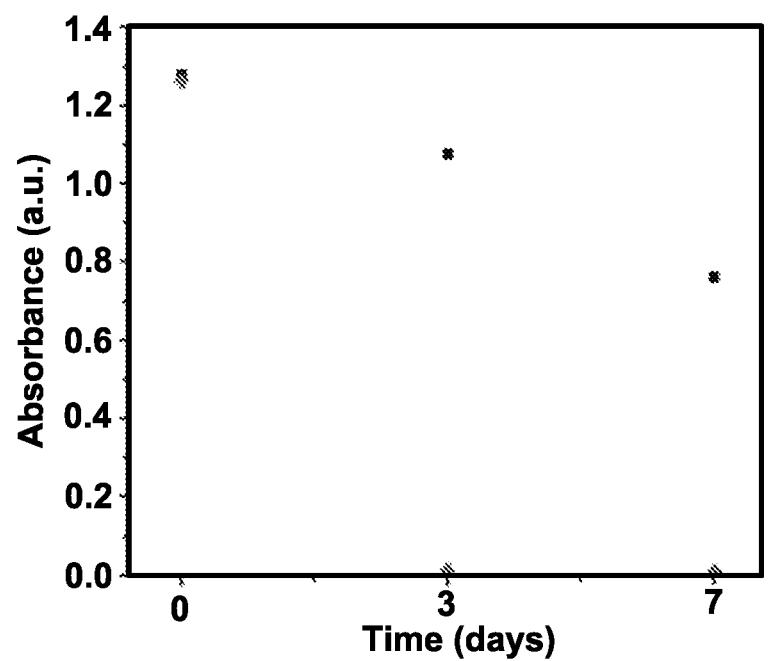
FIG. 3B graphically illustrates sedimentation of ball-milled $VO_2@SiO_2$ nanowires dispersed in deionized water (diamonds) and in deionized water with the addition of 1 wt. % methacrylic acid/ethyl acrylate (squares) in accordance with embodiments of the disclosure.
Figure 3D:
FIG. 3D Digital photograph indicating the transparency of a film cast from MAA/EA and $VO_2@SiO_2$ dispersion with acetone-reduced wires with a width of 180±70 nm.
Figure 3C:
FIG. 3C Digital photograph indicating the transparency of a film cast from MAA/EA and $VO_2@SiO_2$ dispersion with 2-propanol-reduced wires with a width of 210±70 nm.
Figure 3F:
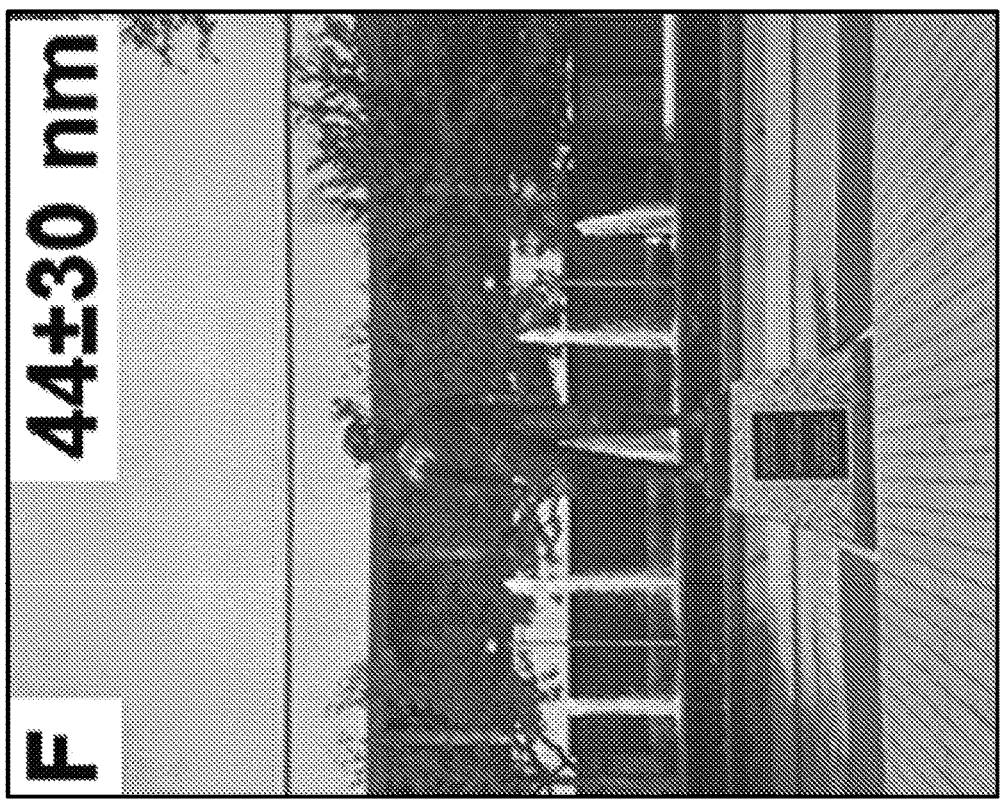
FIG. 3F Digital photograph indicating the transparency of a film cast from MAA/EA and $VO_2@SiO_2$ dispersion with ultra-small $VO_2$ nanoparticles with a size range of 44±30 nm.
Figure 3E:
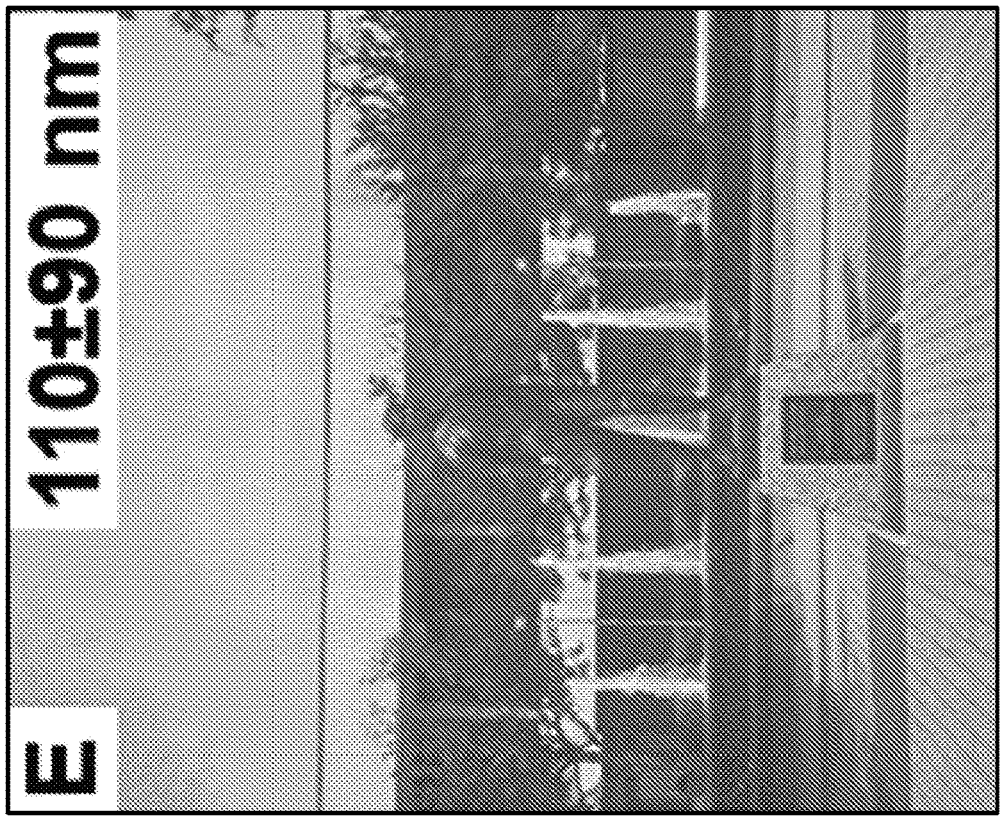
FIG. 3E Digital photograph indicating the transparency of a film cast from MAA/EA and $VO_2@SiO_2$ dispersion with 2-propanol-reduced wires after ball milling. Particle widths were 110±90 nm.
Figure 4A:
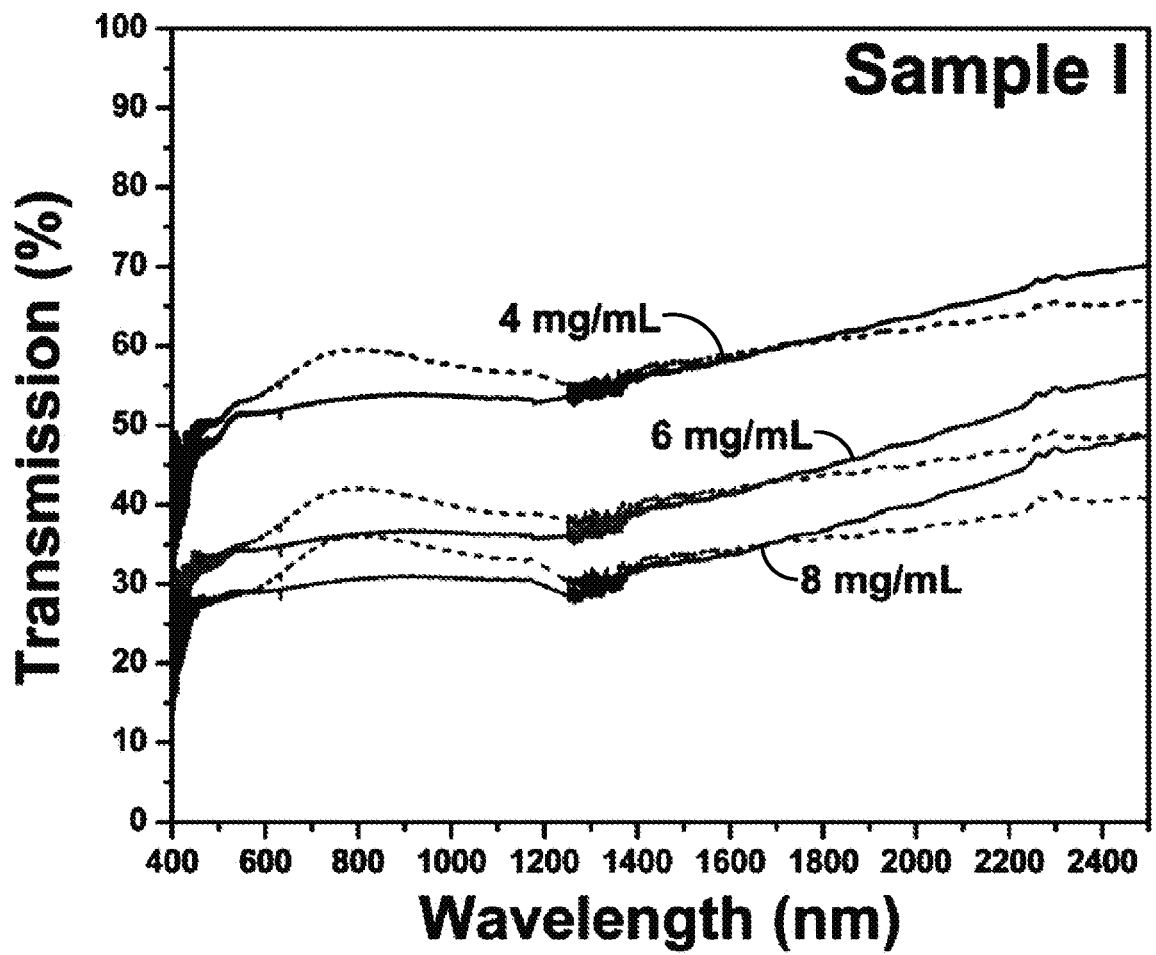
FIGS. 4A-4D graphically illustrate ultraviolet-visible-near-infrared (UV-Vis-NIR) transmission spectra acquired for nanocomposite $VO_2@SiO_2$/methacrylic acid/ethyl acrylate thin films above (dotted lines) and below (solid lines) an insulator-metal transition temperature prepared from dispersions of samples I, A, I-BM, and US, respectively prepared at various nanocrystal loadings in accordance with embodiments of the disclosure.
Figure 4B:
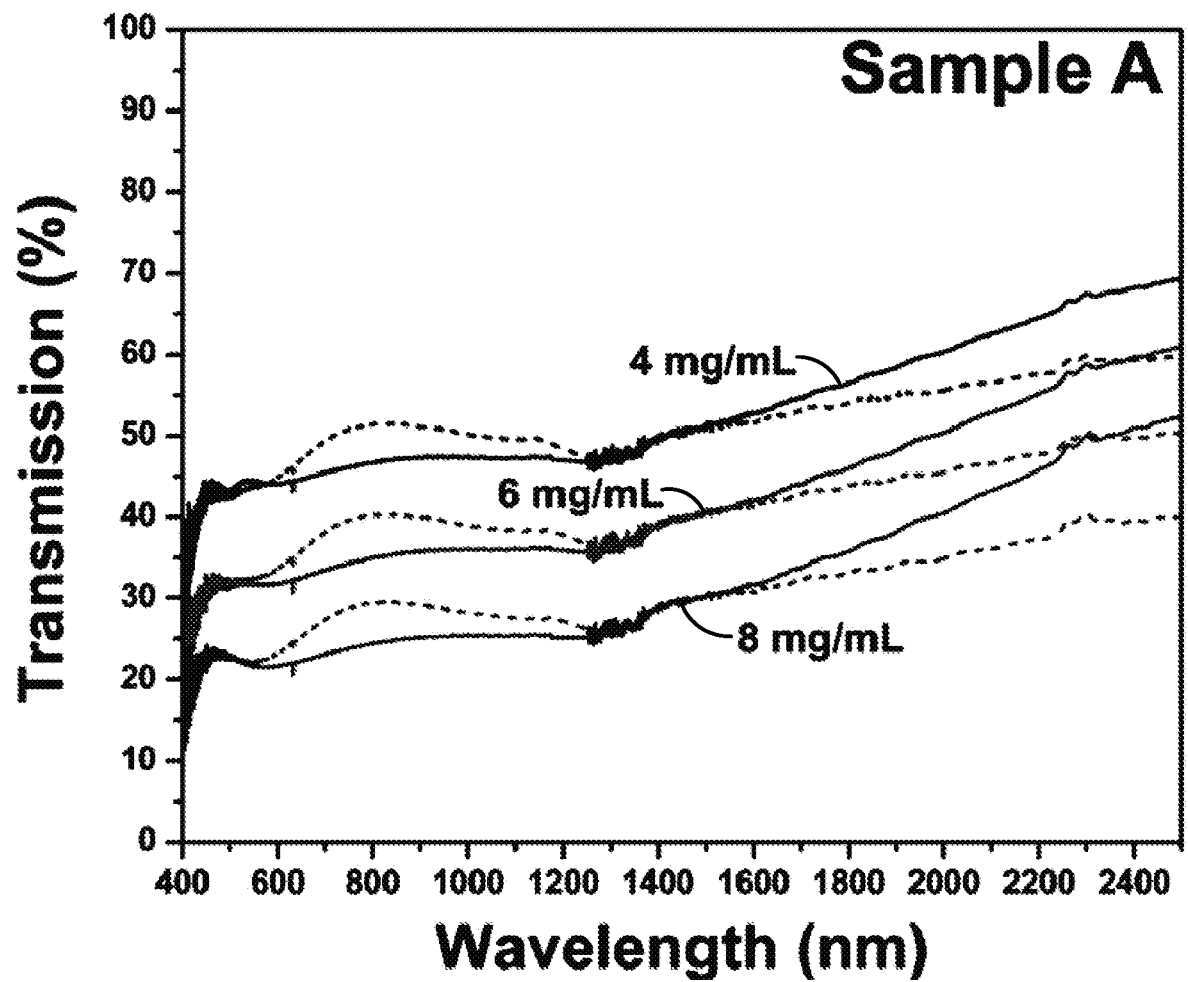
Figure 4C:
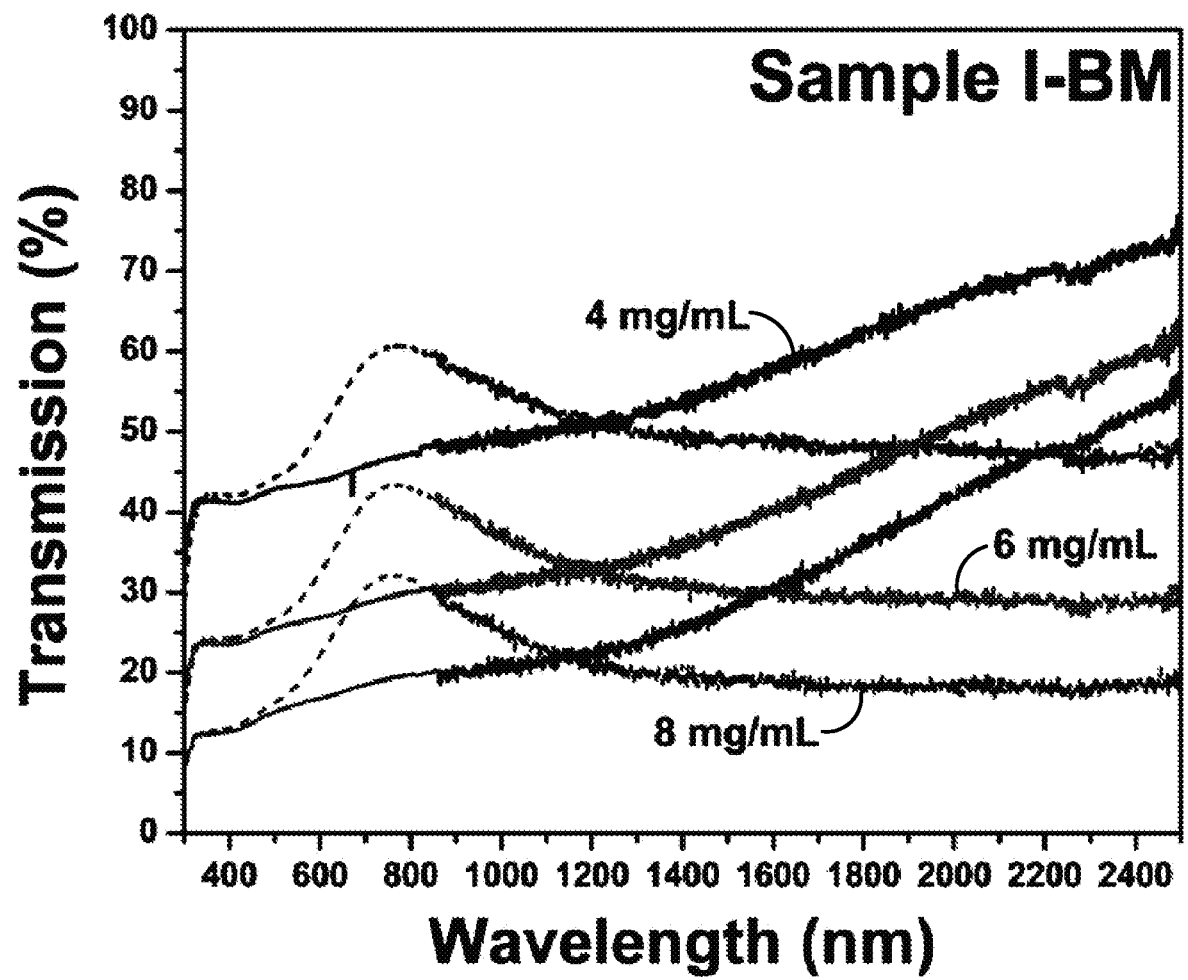
Figure 4D:
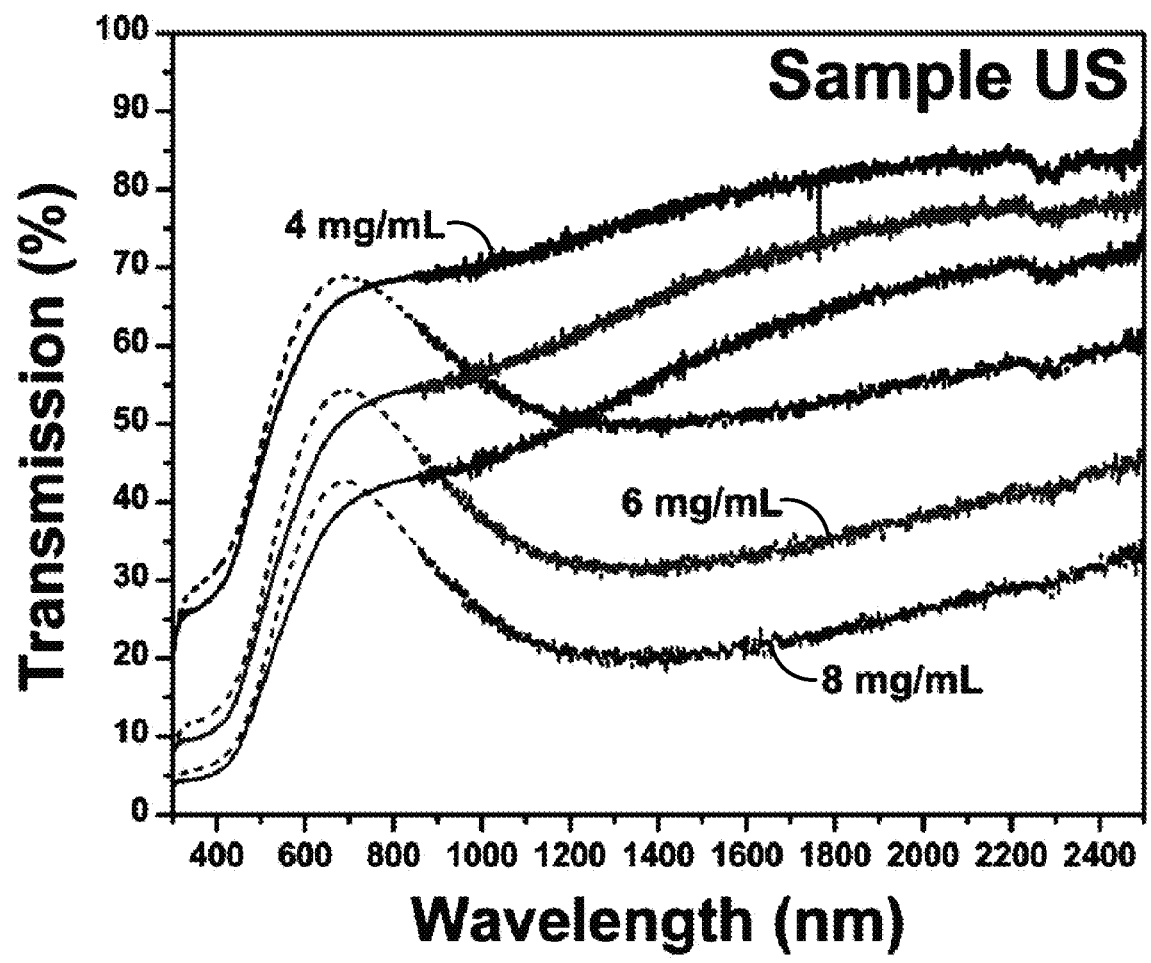
Figure 5:
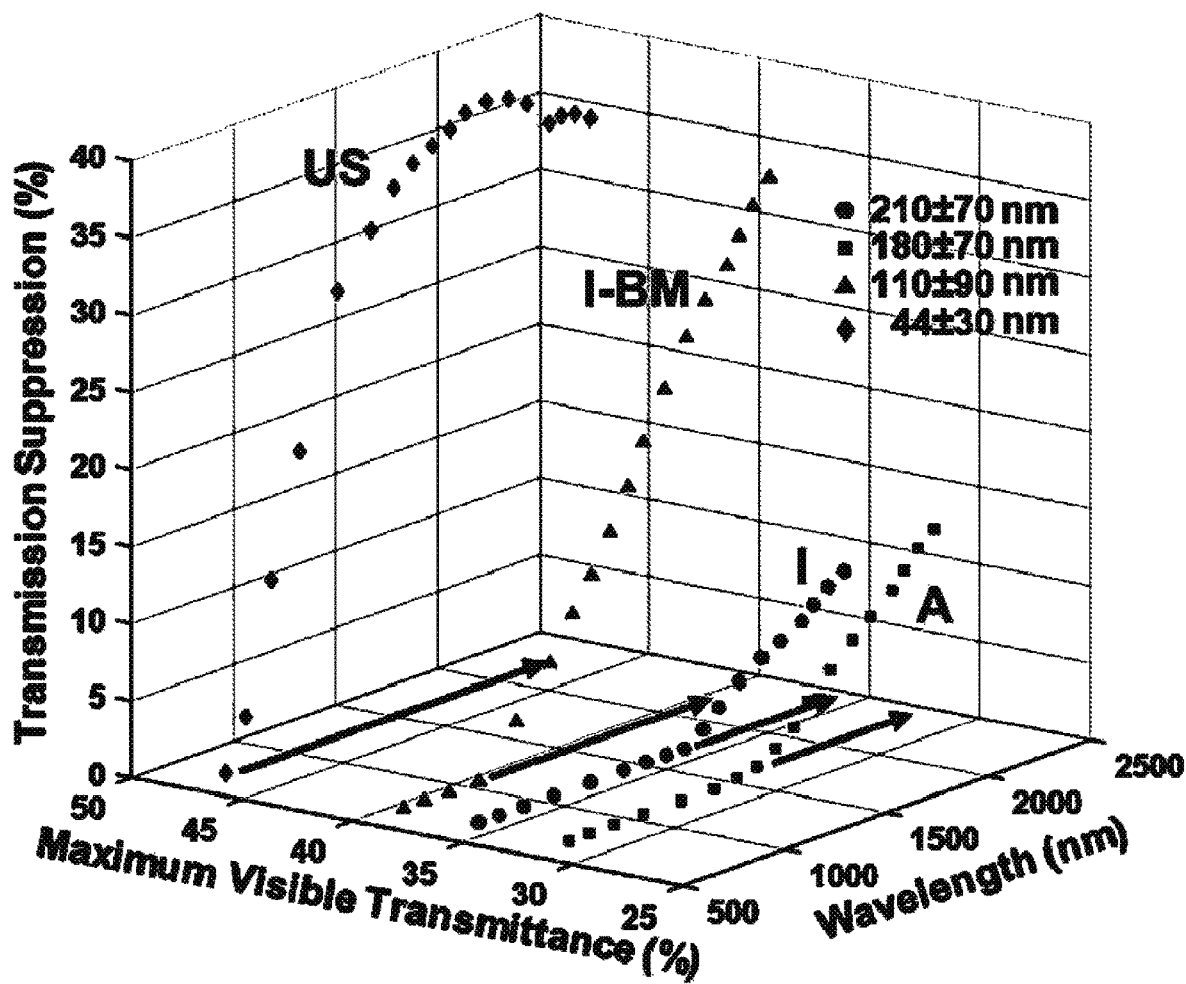
FIG. 5 is a three-dimensional (3D) plot of the NIR light transmittance modulation versus wavelength versus visible transmittance for the four sets of samples; I (circles), A (squares), I-BM (triangles), and US (diamonds)
Figure 6:
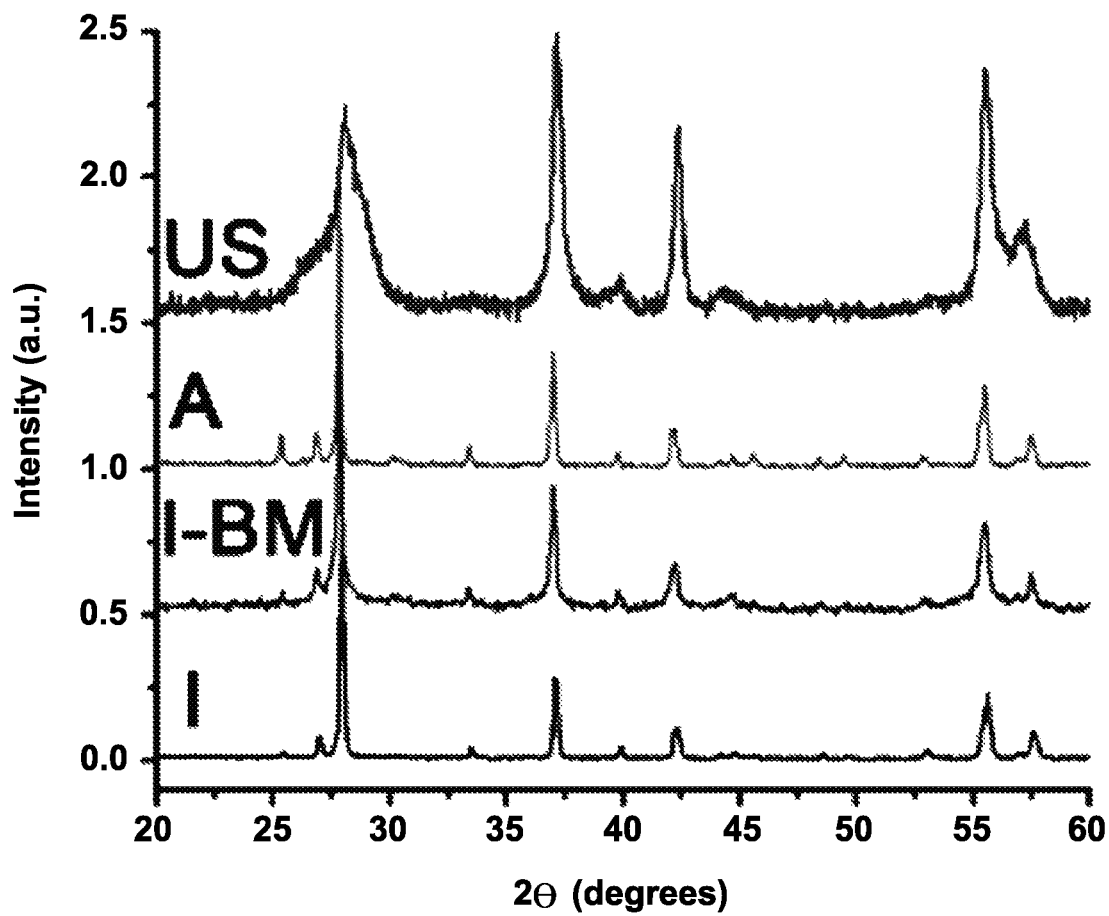
FIG. 6 provides X-ray diffraction patterns of $VO_2$ nanocrystals in accordance with embodiments of the disclosure.

The methacrylic acid/ethyl acrylate copolymer is typically stored under acidic conditions; upon titration of a base, methacrylic acid groups within the copolymer become deprotonated and take on an anionic charge. Charge repulsion between anionic groups induces swelling of the copolymer changing the rheology and allowing for stabilization of colloidal dispersions of VO$_2$@SiO$_2$ nanocrystals. FIG. 3A illustrates methacrylic acid/ethyl acrylate copolymer dispersions of VO$_2$@SiO$_2$ nanocrystals allowed to stand for up to 7 days after mixing. FIG. 3B contrasts the stability of the VO$_2$@SiO$_2$ colloidal dispersions in deionized water and methacrylic acid/ethyl acrylate copolymer aqueous media (0.3 mg VO$_2$@SiO$_2$/mL solution) as a function of time clearly illustrating the decreased sedimentation obtained for the latter. The viscous acrylic dispersions have been used to form VO$_2$ nanocomposite coatings by a facile straight-edge knife casting process. The obtained films are visually transparent and smooth as shown in FIG. 3C. For the same VO$_2$ nanocrystal loading (0.6 mg VO$_2$@SiO$_2$/mL solution), it is clear that the nanowire samples with larger dimensions (Samples I and A) present a darker appearance as compared to the smaller nanocrystals (Samples I-BM and US).

Example 6: Film Casting

Nanocomposite thin films of VO$_2$@SiO$_2$ were cast onto borosilicate glass substrates using 1.25 mL of the methacrylic acid/ethyl acrylate copolymer/VO$_2$ dispersion with various loadings of VO$_2$ nanocrystals (4-8 mg of VO$_2$@SiO$_2$ dispersed in 10 mL of the acrylate aqueous solution). The dispersion was placed on the glass slide and drawn down using a BYK film casting knife set to a wet thickness of 1 mm. The films were then allowed to dry overnight in ambient air. The dry thickness of the films was on the order of ca. 1-2 µm.

Example 7: Particle and Film Characterization

High-resolution transmission electron microscopy (HRTEM) images of VO$_2$ and VO$_2$@SiO$_2$ nanocrystals were obtained using a JEOL JEM-2010 instrument operated at 200 kV with a beam current of 100 mA. Samples for HRTEM were prepared by dispersing the VO$_2$ and VO$_2$@SiO$_2$ nanoparticles in 2-propanol or ethanol and dropping the dispersion onto 300 mesh copper grids coated with amorphous carbon. The grid was then allowed to dry under ambient conditions.

Transmission spectra of VO$_2$@SiO$_2$/methacrylic acid/ethyl acrylate copolymer dispersions in water were obtained using a using a multi-wavelength Bruker Vertex-70 FTIR spectrometer utilizing a Pike Technologies temperature stage and films were allowed to equilibrate for 10 min at each temperature. A Perkin Elmer Lambda 950 UV/Vis/NIR Spectrophotometer with a 150 mm integrating sphere equipped with a custom designed and calibrated heating stage was also used for transmittance and absorptance data acquisition. Films were allowed to equilibrate for 5 min at each temperature. All transmission spectra were corrected for the transmission of the methacrylic acid/ethyl acrylate copolymer by taking a blank spectrum of glass and polymer and adding the reduction in optical transmittance attributed to the glass and copolymer alone; consequently, the measured values correspond to the optical properties of the embedded VO$_2$ nanocrystals.

Example 8: Theoretical Dependence of Light Transmittance on Particle Size

Figure 1C:
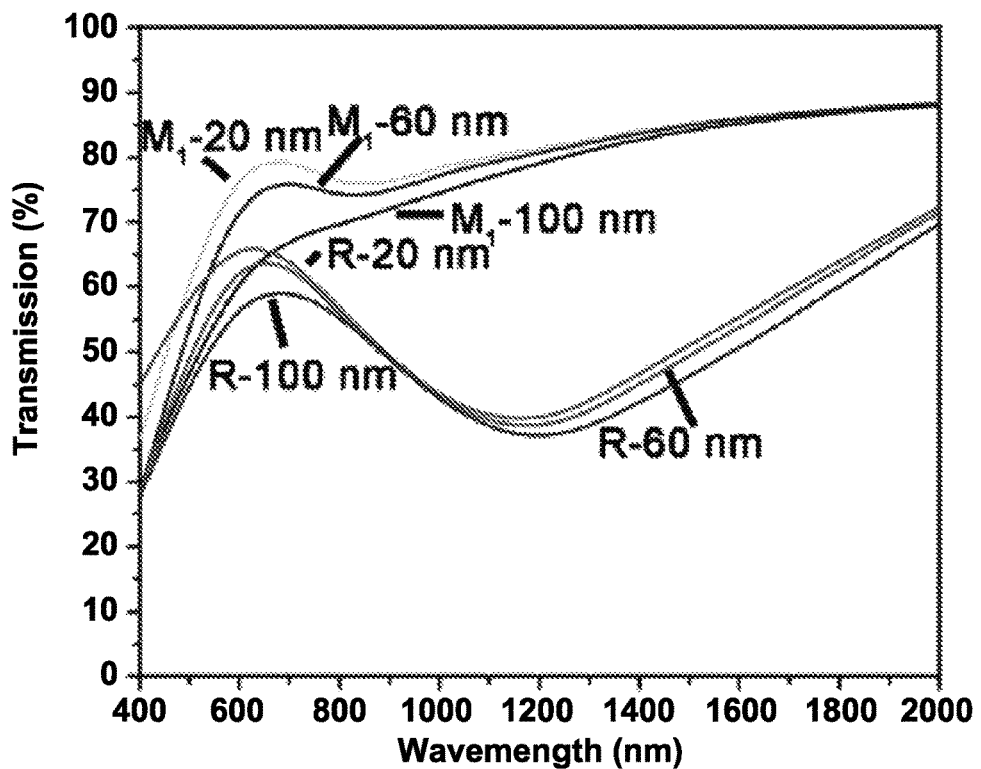
FIG. 1C graphically illustrates a transmittance spectra simulated for a nanocomposite with spherical $VO_2$ nanoparticles of varying diameters (as labeled in the plot) in the insulating and metallic phases.
Figure 1D:
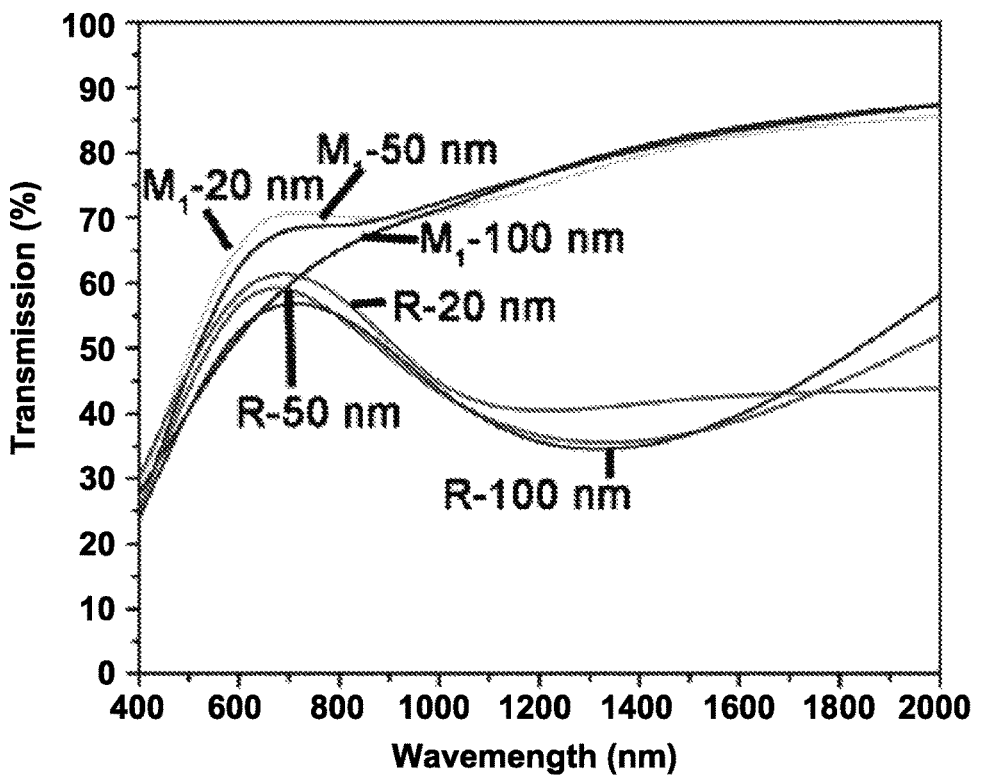
FIG. 1D graphically illustrates a transmittance spectra simulated for a nanocomposite with 100 nm length $VO_2$ nanowires of varying diameters (as labeled in the plot) in the insulating and metallic phases. All composites have a thickness of 5 m and a fill factor of 3.7 wt. %. A temperature-invariant refractive index of 1.5 is assumed for the host polymeric matrix.

In order to elucidate the particle size dependence of the optical properties of nanomaterials, simulations have been performed using two models: the effective medium model (EMM) and finite element analysis+geometrical optics (FEA+GO). The simple EMM approach assumes that the nanoparticle has a single refractive index (n) and extinction ratio (k), and assumes that the particles are uniformly distributed throughout a low-refractive-index medium (FIG. 1A). The simulated spectrum (FIG. 1B) predicts a dramatic modulation of ca. 40% in the near-IR region of the electromagnetic spectrum using the optical constants of bulk VO$_2$ in the monoclinic (M1) and tetragonal phases. The simulation assumes a constant refractive index of ca. 1.5, which is typical of polymeric media. These results underscore the need for a uniform distribution of particles within a low-refractive-index matrix to achieve the desired NIR modulation. The FEA+GO simulations allow for a more detailed elucidation of particle-size-dependent optical properties. Spectra have been simulated for a composite with a fill factor of 3.7 wt. % of spherical VO$_2$ nanoparticles of varying diameters again assuming a temperature-independent refractive index of 1.5 for the polymeric media and the bulk optical constants for the insulating and metallic phases. As the diameter increases from 20 nm to 100 nm, the near-infrared modulation is observed to remain constant at ca. 40% (FIG. 1C). However, the visible light transmittance (at 680 nm) decreases from 80% to 68% for the low-temperature phase. When considering a composite of 100 nm long VO$_2$ wires with varying diameters, the 50 nm and 100 nm diameter wires show a variation of ca. 45% in the near-infrared, whereas the 20 nm wires show a modulation of ca. 40% (FIG. 1D). Although the NIR modulation is slightly diminished for the 20 nm diameter nanowires, they retain superior visible light transmittance. The substantial diminution in visible light transmittance with increasing particle is derived from the scattering background contributed by larger particles. Agglomeration of particles will to first order mimic the effects of having larger particles. These simulations indicate that the viability of utilizing VO$_2$ nanocrystals for effective thermochromic modulation will depend sensitively on their dimensions and their extent of dispersion.

Example 9: Experimental Dependence of Light Transmittance on Particle Size

In order to experimentally study the effects of particle size on the optical spectra of the nanocomposite films, VO$_2$ nanocrystals have been synthesized using different hydrothermal methods, as detailed further herein. Four different particle sizes are examined here: Sample I includes nanowires prepared by the hydrothermal reduction of V$_2$O$_5$ by 2-propanol and span 210±70 nm in diameter and range tens of microns in length as shown in FIG. 2A. The use of acetone as a reducing agent yields nanowires that again span several micrometers in length but with substantially reduced diameters of 180±70 nm. These samples are referred to as Sample A; FIG. 2B shows TEM images of these nanowires. To reduce the longitudinal dimensions, the nanowires of Sample I have been dry-milled with methacrylate polymer beads to obtain Sample I-BM (FIG. 2C).

Ball milling greatly diminishes the particle size to 110±90 nm but a relatively large size distribution is observed and the nanocrystals are observed to be highly agglomerated. Finally, to achieve "ultra-small" nanocrystals with an approximate size distribution of 44±30 nm, VO(OH)$_2$ is first precipitated using sol-gel techniques, followed by hydrothermal crystallization (referred to as Sample US, FIG. 2D). The four samples examined here serve as effective test beds for elucidating particle size effects on visible light transmittance and near-infrared modulation.

Example 10: Temperature-Dependent Modulation and Onset of Modulation of NIR Light Transmittance UV-visible-NIR transmission spectra of nanocomposite films prepared using the four VO$_2$@SiO$_2$ samples are shown in FIG. 4. Three different nanocrystal loadings have been contrasted in each instance. All the spectra show a clear divergence of the high-temperature (solid) plots from the low-temperature (dashed) plots. The insulating phase of VO$_2$ has a bandgap estimated to be ca. 0.8 eV whereas with closing of the gap and sharp increase in carrier density upon metallization, the reflectance is greatly increased and the transmittance is greatly diminished in the NIR region of the electromagnetic spectrum. Considering FIG. 4A, for Sample I, the visible light transmittance is diminished and the NIR modulation is increased with increased particle loading. A similar trend indeed holds across all of the samples (FIG. 4 and TABLE 1). For larger nanocrystal sizes as well as agglomerations of smaller particles, dynamical modulation is diminished as a result of Mie scattering from both large individual crystallites and their agglomerations as well as refractive index mismatch between the low- and high-temperature phases of VO$_2$ and the host polymer matrix. The smallest particle dimensions (44±30 nm, Sample US) appear to provide the best combination of visible light transmittance and NIR modulation (blocking up to ca. 16.62% of total solar energy and 32.18% of energy in the NIR) with an onset of NIR modulation in the range of 740-750 nm.

TABLE 1

Collated data summarizing $\Delta T_{sol}$ (%), $\Delta T_{NIR}$ (%), $T_{lum}$ (%), and onset of NIR modulation for the four different size distributions of VO$_2$ nanocrystals encapsulated within SiO$_2$ shells for various particle loadings dispersed in an acrylate matrix. $T_{lum}$ (%) is shown for films at 25° C.

| Sample (size nm) | $\Delta T_{sol}$ (%) | | | $\Delta T_{NIR}$ (%) | | | $T_{lum}$ (%) ($\Delta T_{lum}$(%)) | | | Onset of NIR Modulation (nm) | | |
|---|---|---|---|---|---|---|---|---|---|---|---|---|
| | 4 mg/ 10 mL | 6 mg/ 10 mL | 8 mg/ 10 mL | 4 mg/ 10 mL | 6 mg/ 10 mL | 8 mg/ 10 mL | 4 mg/ 10 mL | 6 mg/ 10 mL | 8 mg/ 10 mL | 4 mg/ 10 mL | 6 mg/ 10 mL | 8 mg/ 10 mL |
| I (210 ± 70) | −2.60 | −2.00 | −1.60 | −0.90 | −0.30 | −0.20 | 51.9 (−3.5) | 34.8 (−2.8) | 29.4 (−2.00) | 1730 | 1660 | 1660 |
| A (180 ± 70) | −0.90 | −1.30 | −1.00 | 1.00 | 0.80 | 1.30 | 44.6 (−1.8) | 32.4 (−2.8) | 22.2 (−2.5) | 1380 | 1380 | 1380 |
| I-BM (110 ± 90) | −1.54 | −0.83 | 0.25 | 6.13 | 7.52 | 9.08 | 44.48 (−8.30) | 27.42 (−7.42) | 17.30 (−7.49) | 1208 | 1184 | 1150 |
| US (44 ± 30) | 10.28 | 13.52 | 16.62 | 23.18 | 30.34 | 32.18 | 61.44 (−3.43) | 44.44 (−4.60) | 33.47 (−4.04) | 749 | 746 | 741 |

Notably, it is not just the extent of NIR modulation but also the onset of the modulation that will determine the efficacy of the nanocomposite in bringing about effective modulation of the solar heat gain. The onset of NIR modulation at relatively shorter wavelengths denotes an ability to dynamically adjust transmittance for a relatively greater region of the solar spectrum. For Samples I and A, the onset of NIR modulation begins at ca. 1660 nm and 1380 nm, respectively, and the maximum NIR modulation is observed at ca. 2500 nm, where the solar flux is rather weak. In contrast, for the US samples, the onset of the drop is blue-shifted to ca. 740 nm and much more rapidly reaches a maximum at ca. 1200-1400 nm. Notably, NIR modulation below 680 nm is not desirable since that will bring about a pronounced change of the visible appearance of the film. FIG. 4 and TABLE 1 contrast the NIR modulation and visible light transmittance of the four different nanocrystallite sizes at a loading of 8 mg/10 mL and clearly indicates the vastly greater visible light transmittance and higher NIR modulation observed for the US sample with optimal nanocrystal dimensions. For the I and A samples, the modulation at 1300 nm is less than 5% and then sharply increases with increasing wavelength. The relatively diminished NIR modulation results from a pronounced scattering background for the larger particle sizes (the I-BM sample has agglomerates and some larger particles). In sharp contrast, the US sample maintains a modulation of ca. 20% across all wavelengths with a total of ca. 32% integrated modulation in the NIR wavelength range.

A notable observation from FIG. 4 is the significant increase in $T_{lum}$ at higher temperatures and is explicable considering the change in n of the $VO_2$ nanocrystals as a result of the insulator-metal phase transition. The value of n at 700 nm for $VO_2$ is 3.0 for the M1 phase and 2.2 for the R phase, which results in a greater n mismatch between $VO_2$ and the methacrylic acid/ethyl acrylate copolymer host matrix at low temperatures. The $SiO_2$ shell with an intermediate n value of 1.8 enables refractive-index matching between the embedded nanocrystals and the host matrix, thereby serving as an anti-reflective coating and minimizing light scattering at the $VO_2$/methacrylic acid/ethyl acrylate copolymer interface depending on shell thickness. The differential in refractive indices of the two phases gives rise to an increased scattering component for the low-temperature phase that is reflected as a negative $\Delta T_{lum}$ value for the particles with larger dimensions I, A, and I-BM in TABLE 1. From a practical perspective, the negative term strongly affects the overall full-spectrum $T_{lum}$ performance values (TABLE 1). In the case of I, A, and I-BM, the increased $\Delta T_{lum}$ value effectively negates any gains in energy efficiency derived from $\Delta T_{NIR}$ given the higher weighting of the visible region in the AM 1.5 solar spectrum. The rather poor performance metrics of Samples I and A are not surprising based on the simulations in FIG. 1. The low $T_{lum}$ and $\Delta T_{NIR}$ values, coupled with long-wavelength NIR modulation onsets clearly indicate a size-dependent light scattering mechanism. Mie scattering in the visible-NIR region becomes significant when the diameter of the particle is comparable to or greater than the wavelength of the interacting photon, resulting in scattering in the forward direction. In the US samples, both Mie scattering and differential refractive index scattering mechanisms are mitigated (the latter due to development of a plasmon resonance).

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed. The term "about" means plus or minus 5% of the stated value.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A composition comprising:
   a polymeric matrix; and
   a crystalline vanadium oxide nanomaterial dispersed in the polymeric matrix, wherein the crystalline vanadium oxide nanomaterial comprises an average smallest dimension between about 100 nm and about 5 nm,
   wherein the crystalline vanadium oxide nanomaterial has an insulator-metal electronic transition at a temperature between about −20° C. and about 100° C.,
   wherein the insulator-metal electronic transition is accompanied by a modulation of near-infrared (NIR) light transmittance,
   wherein an integrated modulation of light transmittance between about 680 nm and about 2,500 nm is between about 5% and about 75%,
   wherein an onset of modulation of NIR light transmittance occurs between about 680 nm and about 1750 nm, and
   wherein a dried weight:weight ratio of crystalline vanadium oxide nanomaterials to polymeric matrix is between about 0.01 to about 0.6.

2. The composition of claim 1, wherein the crystalline vanadium oxide nanomaterial has an average smallest dimension between about 50 nm and about 5 nm.

3. The composition of claim 1, wherein the crystalline vanadium oxide nanomaterial has an average smallest dimension of about 40 nm.

4. The composition of claim 1, wherein the crystalline vanadium oxide nanomaterial is a nanomaterial selected from the group consisting of a nanoparticle, a nanowire, a nanorod, a nanosphere, a nanostar, and combinations thereof.

5. The composition of claim 1, wherein the crystalline vanadium oxide nanomaterial is encapsulated in an amorphous or crystalline matrix including a material from the group consisting of an oxide, oxyhalide, oxyhydroxide, hydroxide, carbide, sulfide, selenide, and combinations thereof.

6. The composition of claim 5, wherein the amorphous matrix comprises a material selected from the group consisting of silicon oxide, titanium oxide, vanadium oxide, zinc oxide, hafnium oxide, aluminum oxide, zirconium oxide, cerium oxide, molybdenum oxide, and combinations thereof.

7. The composition claim 1, wherein the polymeric matrix comprises a polymeric material selected from the group consisting of a cellulosic polymer, a polycarbonate, a polyimide, a polyurethane, polyvinylidene fluoride, polyethylene terephthalate, and an acrylic acid/acrylate copolymer.

8. The composition of claim 1, wherein the crystalline vanadium oxide nanomaterial is well dispersed within the polymeric matrix.

9. A substrate having a surface, wherein the surface comprises a film comprising:
   a polymeric matrix; and
   a crystalline vanadium oxide nanomaterial dispersed in the polymeric matrix, wherein the crystalline vanadium oxide nanomaterial comprises a smallest dimension between about 5 nm and about 100 nm,
   wherein the crystalline vanadium oxide nanomaterial has an insulator-metal electronic transition at a temperature between about −20° C. and about 100° C.,
   wherein the insulator-metal electronic transition is accompanied by a modulation of near-infrared (NIR) light transmittance, wherein an integrated modulation of light transmittance between about 680 nm and about 2,500 nm is between about 5% and about 75%, wherein an onset of modulation of NIR light transmittance occurs between about 680 nm and about 1750 nm, and wherein a dried weight:weight ratio of crystalline vanadium oxide nanomaterials to polymeric matrix is between about 0.01 to about 0.6.

10. The substrate of claim 9, wherein the substrate is part of a fenestration element.

11. The substrate of claim 10, wherein the fenestration element is selected from the group consisting of a window unit, an insulating glass unit, a skylight, a glazed door, and an automotive lamination.

12. The substrate of claim 9, wherein the film has a thickness of 10 nm to 50 microns.

13. The substrate of claim 9, wherein the substrate includes a material selected from the group consisting of glass, silicon oxide, sapphire, alumina, polymer, plastic, and indium tin oxide-coated glass.

14. The substrate of claim 9, wherein an integrated modulation of visible light transmittance of the film is between about 0% and about 50%.

15. The substrate of claim 9, wherein an integrated modulation of NIR transmittance of the film is between about 5% and about 90%.

16. The substrate of claim 9, wherein an integrated modulation of total solar transmittance of the film is between about 5% and about 50%.

* * * * *